United States Patent
Reibling et al.

(10) Patent No.: US 11,373,462 B2
(45) Date of Patent: Jun. 28, 2022

(54) AUTONOMOUS VEHICLE COMPUTER

(71) Applicant: Ford Motor Company, Dearborn, MI (US)

(72) Inventors: Michael E. Reibling, Sterling Heights, MI (US); Steven Michael Cyr, Lake Orion, MI (US); Ray C. Siciak, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 246 days.

(21) Appl. No.: 16/469,857

(22) PCT Filed: Dec. 16, 2016

(86) PCT No.: PCT/US2016/067085
§ 371 (c)(1),
(2) Date: Jun. 14, 2019

(87) PCT Pub. No.: WO2018/111291
PCT Pub. Date: Jun. 21, 2018

(65) Prior Publication Data
US 2020/0098201 A1   Mar. 26, 2020

(51) Int. Cl.
*G07C 5/00* (2006.01)
*B60K 28/06* (2006.01)
*B60Q 9/00* (2006.01)
*B60R 21/015* (2006.01)
*B60W 30/09* (2012.01)
*H04L 67/12* (2022.01)

(52) U.S. Cl.
CPC .............. *G07C 5/008* (2013.01); *B60K 28/06* (2013.01); *B60Q 9/00* (2013.01); *B60R 21/015* (2013.01); *B60W 30/09* (2013.01); *H04L 67/12* (2013.01); *B60W 2540/21* (2020.02)

(58) Field of Classification Search
CPC ....................................................... G07C 5/008
See application file for complete search history.

(56) References Cited

U.S. PATENT DOCUMENTS

| 6,734,799 | B2 * | 5/2004 | Munch | G08B 21/06 340/435 |
| 7,667,609 | B1 * | 2/2010 | Roe | G08B 21/04 340/576 |
| 8,044,772 | B1 * | 10/2011 | Roe | G08B 21/22 340/7.5 |

(Continued)

FOREIGN PATENT DOCUMENTS

| EP | 2877360 A1 * | 6/2015 | ........... B62D 15/025 |
| WO | WO-2014015990 A1 * | 1/2014 | ......... B62D 15/0285 |

OTHER PUBLICATIONS

Society of Automotive Engineers, SAE J3016TM Levels of Driving Automation, May 3, 2021 (1 page).

*Primary Examiner* — Michael A Berns
(74) *Attorney, Agent, or Firm* — Brandon Hicks; Eversheds Sutherland (US) LLP

(57) ABSTRACT

A computer in a vehicle is programmed to receive sensor data about a vehicle occupant, select a category of behavior of the occupant based on the sensor data, and navigate to a predetermined location based on the selected category. The vehicle may be an autonomous vehicle that can be operated by the computer.

14 Claims, 2 Drawing Sheets

(56) References Cited

U.S. PATENT DOCUMENTS

| | | | | |
|---|---|---|---|---|
| 8,698,639 | B2* | 4/2014 | Fung | B60W 30/08 |
| | | | | 340/576 |
| 8,874,301 | B1* | 10/2014 | Rao | B60K 28/04 |
| | | | | 701/25 |
| 9,317,983 | B2* | 4/2016 | Ricci | A61B 5/4809 |
| 9,399,430 | B2* | 7/2016 | Kirsch | B60Q 1/00 |
| 9,489,966 | B1* | 11/2016 | Hassani | G10L 15/22 |
| 9,905,133 | B1* | 2/2018 | Kumar | G08G 1/202 |
| 10,156,848 | B1* | 12/2018 | Konrardy | B60R 16/0234 |
| 10,241,511 | B2* | 3/2019 | Regmi | A61B 5/01 |
| 10,368,806 | B2* | 8/2019 | Kim | A61B 5/7282 |
| 10,493,952 | B1* | 12/2019 | Schwie | E05F 15/72 |
| 2014/0306826 | A1* | 10/2014 | Ricci | G01C 21/3697 |
| | | | | 340/573.1 |
| 2015/0246673 | A1* | 9/2015 | Tseng | B60W 30/16 |
| | | | | 701/23 |
| 2017/0316533 | A1* | 11/2017 | Goldman-Shenhar | |
| | | | | G06Q 50/30 |

* cited by examiner

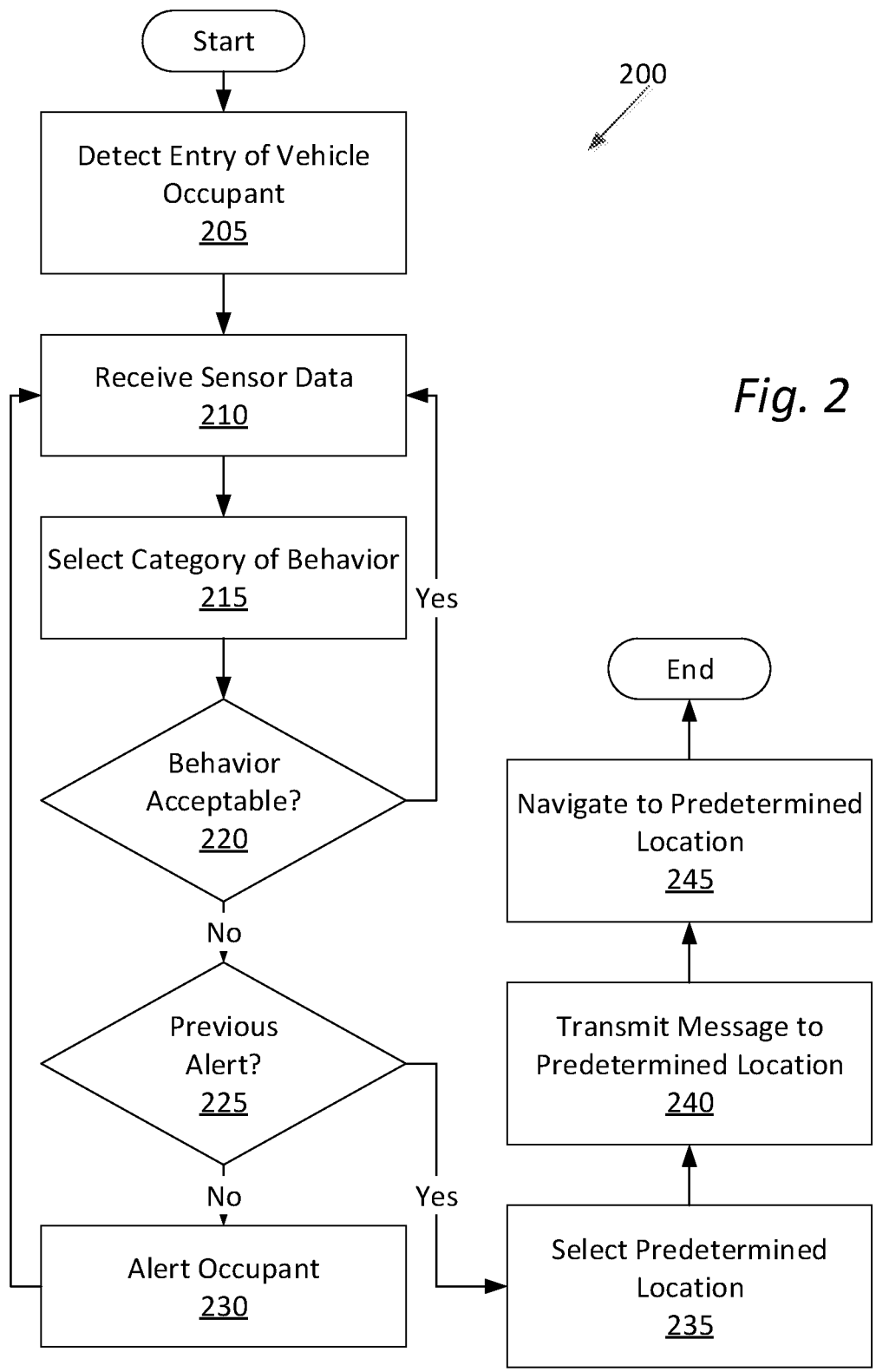

AUTONOMOUS VEHICLE COMPUTER

BACKGROUND

Autonomous vehicles may be useful for ride-sharing, ride-hailing, taxi, and other services transporting occupants who do not own the autonomous vehicle. However, occupants of an autonomous vehicle may engage in dangerous behavior or experience medical emergencies during a ride. These types of emergencies may lead to injury to the occupant or others, financial liability by the transportation service, or even a collision by the vehicle.

BRIEF DESCRIPTION OF THE DRAWINGS

FIG. 2 is a process flow diagram of an exemplary process for the autonomous vehicle of FIG. 1 to monitor and respond to an emergency involving an occupant.

DETAILED DESCRIPTION

Figure 1:
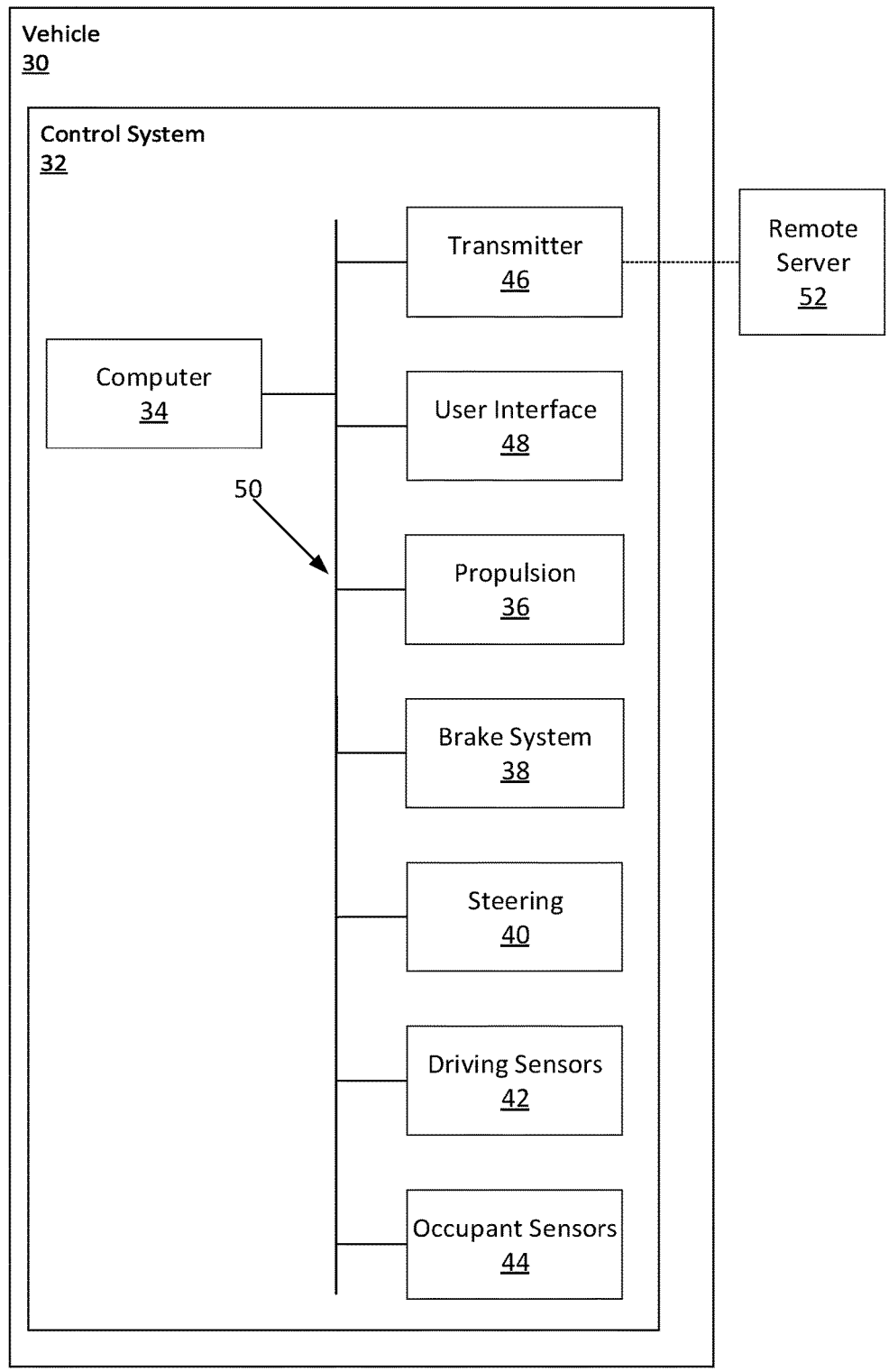
FIG. 1 is a block diagram of an example autonomous vehicle.

With reference to FIG. 1, a computer 34 in a vehicle 30 is programmed to receive sensor data about a vehicle occupant, select a category of behavior of the occupant based on the sensor data, and navigate to a predetermined location based on the selected category.

The programming of the computer 34 solves a problem unique to autonomous vehicles, namely, monitoring occupants and responding in an automated fashion to an emergency. An owner of an autonomous vehicle, such as a transportation service, may reduce the likelihood that occupants or others are injured; reduce the likelihood that the vehicle is involved in a collision; reduce the likelihood that the vehicle is damaged by the occupant, such as by physical damage or by smoke damage; and reduce the likelihood of financial liability to the owner.

The vehicle 30 may be an autonomous vehicle. The computer 34, sometimes referred to as the vehicle controller, may be capable of operating the vehicle 30 independently of the intervention of a human driver, completely or to a greater or a lesser degree. The computer 34 may be programmed to operate a propulsion 36, brake system 38, steering 40, and/or other vehicle systems.

For purposes of this disclosure, an autonomous mode is defined as one in which each of propulsion 36, brake system 38, and steering 40 of the vehicle 30 are controlled by one or more computers; in a semi-autonomous mode computer(s) of the vehicle 30 control(s) one or two of vehicle propulsion 36, braking 38, and steering 40. By way of context, the Society of Automotive Engineers (SAE) has defined multiple levels of autonomous vehicle operation. At levels 0-2, a human driver monitors or controls the majority of the driving tasks, often with no help from the vehicle 30. For example, at level 0 ("no automation"), a human driver is responsible for all vehicle operations. At level 1 ("driver assistance"), the vehicle 30 sometimes assists with steering, acceleration, or braking, but the driver is still responsible for the vast majority of the vehicle control. At level 2 ("partial automation"), the vehicle 30 can control steering, acceleration, and braking under certain circumstances without human interaction. At levels 3-5, the vehicle 30 assumes more driving-related tasks. At level 3 ("conditional automation"), the vehicle 30 can handle steering, acceleration, and braking under certain circumstances, as well as monitoring of the driving environment. Level 3 requires the driver to intervene occasionally, however. At level 4 ("high automation"), the vehicle 30 can handle the same tasks as at level 3 but without relying on the driver to intervene in certain driving modes. At level 5 ("full automation"), the vehicle 30 can handle almost all tasks without any driver intervention. The vehicle 30 may operate in one or more of the levels of autonomous vehicle operation. According to the above definitions of this disclosure, therefore, nonautonomous modes of operation may refer to levels 0-1, semi-autonomous modes of operation may refer to levels 2-3, and fully autonomous modes of operation may refer to levels 4-5.

The vehicle 30 includes a control system 32. The control system 32 includes the computer 34, the propulsion 36, the brake system 38, the steering 40, driving sensors 42, occupant sensors 44, a transmitter 46, and a user interface 48. These components of the control system 32 may transmit signals to one another through a communications network 50 such as a controller area network (CAN) bus, Ethernet, Local Interconnect Network (LIN), and/or by any other wired or wireless communications network.

The propulsion 36 of the vehicle 30 generates energy and translates the energy into motion of the vehicle 30. The propulsion 36 may be a known vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 36 can include an electronic control unit (ECU) or the like that is in communication with and receives input from the computer 34 and/or from a human driver. The human driver may control the propulsion 36 via, e.g., an accelerator pedal and/or a gear-shift lever.

The brake system 38 is typically a known vehicle braking subsystem and resists the motion of the vehicle 30 to thereby slow and/or stop the vehicle 30. The brake system 38 may be friction brakes such as disc brakes, drum brakes, band brakes, etc.; regenerative brakes; any other suitable type of brakes; or a combination. The brake system 38 can include an electronic control unit (ECU) or the like that is in communication with and receives input from the computer 34 and/or a human driver. The human driver may control the brake system 38 via, e.g., a brake pedal.

The steering 40 is typically a known vehicle steering subsystem and controls the turning of the wheels. The steering 40 can include an electronic control unit (ECU) or the like that is in communication with and receives input from a steering wheel and/or the computer 34. The steering 40 may be a rack-and-pinion system with electric power-assisted steering, a steer-by-wire system, as are both known, or any other suitable system.

The control system 32 may include the driving sensors 42. The driving sensors 42 may detect internal states of the vehicle 30, for example, wheel speed, wheel orientation, and engine and transmission variables. The driving sensors 42 may detect the position or orientation of the vehicle 30, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The driving sensors 42 may detect the external world, for example, radar sensors, scanning laser range finders, light detection and ranging (LIDAR) devices, and image processing sensors such as cameras. The sensors may include communications devices, for example, vehicle-to-infrastructure (V2I) or vehicle-to-vehicle (V2V) devices.

The control system 32 may include occupant sensors 44 to detect the presence, condition, actions, and so on of occupants of the vehicle 30. The occupant sensors 44 may include health sensors such as heart rate, blood pressure, and body temperature sensors; visible-light or infrared cameras; electrochemical detectors and/or air samplers; microphones; weight sensors inside seats; sensors detecting whether a seatbelt is buckled or unspooled; and other types of sensors directed to the occupants.

The computer 34 is included in the control system 32 for carrying out various operations, including as described herein. The computer 34 is a computing device that generally includes a processor and a memory, the memory including one or more forms of computer-readable media, and storing instructions executable by the processor for performing various operations, including as disclosed herein. The memory of the computer 34 further generally stores remote data received via various communications mechanisms; e.g., the computer 34 is generally configured for communications on a controller area network (CAN) bus or the like, and/or for using other wired or wireless protocols, e.g., Bluetooth, etc. The computer 34 may also have a connection to an onboard diagnostics connector (OBD-II). Via the communications network 50, the computer 34 may transmit messages to various devices in the vehicle 30 and/or receive messages from the various devices, e.g., controllers, actuators, sensors, etc., e.g., controllers and sensors as discussed herein. Although one computer 34 is shown in FIG. 1 for ease of illustration, it is to be understood that the computer 34 could include, and various operations described herein could be carried out by, one or more computing devices.

The transmitter 46 may be connected to the communications network 50. The transmitter 46 may be adapted to transmit signals wirelessly through any suitable wireless communication protocol, such as Bluetooth, WiFi, 802.11a/b/g, radio, etc. The transmitter 46 may be adapted to communicate with a remote server 52, that is, a server distinct and spaced from the vehicle 30. The remote server 52 may be located outside the vehicle 30. For example, the remote server 52 may be associated with other vehicles (e.g., V2V communications), infrastructure components (e.g., V2I communications), emergency responders, mobile devices associated with the owner or occupant of the vehicle 30, etc.

The user interface 48 presents information to and receives information from an occupant of the vehicle 30. The user interface 48 may be located, e.g., on an instrument panel in a passenger cabin of the vehicle 30, or wherever may be readily seen and/or heard by the occupant. The user interface 48 may include dials, digital readouts, screens, speakers, and so on for providing information to the occupant, e.g., human-machine interface (HMI) elements such as are known. The user interface 48 may include buttons, knobs, keypads, microphone, and so on for receiving information from the occupant.

FIG. 2 is a process flow diagram illustrating an exemplary process 200 for the computer 34 to monitor and respond to an emergency involving an occupant of the vehicle 30. The steps of the process 200 are programmed into the computer 34. The process 200 begins in a block 205, in which the computer 34 receives a signal from the occupant sensors 44 indicating that an occupant has entered the vehicle 30. The signal from the occupant sensors 44 may indicate, for example, that a door has opened, that a seatbelt has been buckled, that a weight is in a seat of the vehicle 30, a visual image of an occupant, etc.

Next, in a block 210, the computer 34 receives sensor data about the vehicle occupant from the occupant sensors 44. The sensor data may include data indicating gestures by the occupant, such as arm movements, body movements, etc.; facial expressions, such as happiness, distress, nausea, pain, etc.; smoke production, such as produced by lit cigarettes; and/or voice level, such as silence, conversational speaking, yelling, etc.

Next, in a block 215, the computer 34 selects a category of behavior of the occupant based on the sensor data. The behavior used for the selection is at least one of a gesture, a facial expression, smoke production, and a voice level of the occupant. The categories may be stored as sets of conditionals specifying gestures, etc. indicating behaviors within the categories. The categories may include, for example, emergency and nonemergency. Behavior that a system designer designates as undesirable in the vehicle 30 may be classified as emergency, for example, smoking, fighting, consuming alcoholic beverages, leaning out a window, etc. All other behavior may be classified as nonemergency. Some or all of the sensor data may be run through algorithms for identifying gestures and/or facial expressions. If the algorithm finds a gesture of, e.g., an occupant punching another occupant, then one of the conditionals for the emergency category may be triggered, putting the behavior in that category.

For another example, the categories may include medical emergency, behavior emergency, and nonemergency. The medical emergency category may include behaviors such as gripping an extremity, elevated heart rate, vomiting, seizures, facial expressions indicating pain, etc. The behavior emergency category may include behaviors such as smoking, fighting, consuming alcoholic beverages, leaning out a window, carrying prohibited cargo onboard, etc. "Prohibited cargo" refers to cargo that an owner of the vehicle 30 has decided should not be allowed in the vehicle 30, such as explosives, firearms, or illegal drugs. The nonemergency category may include all other behaviors. The nonemergency category may also include some behaviors from the medical emergency category coupled with a statement from the occupant such as "I'm fine."

For yet another example, the categories may include multiple categories for different types of medical emergencies, a category for a severe behavior emergency, a category for a nonsevere behavior emergency, and a category for a nonemergency. The severe behavior emergency category may include behaviors such as fighting, and the nonsevere behavior emergency category may include other behaviors such as smoking.

Next after the block 215, in a decision block 220, the computer 34 determines whether the behavior exhibited by the occupant is acceptable. The stored categories may be associated in the memory with either acceptable or unacceptable. For example, the nonemergency category may be considered acceptable, and the emergency category unacceptable. For another example, the nonemergency category may be considered acceptable, and the medical emergency and behavior emergency categories may be considered acceptable. If the behavior is considered acceptable, the process 200 returns to the block 210 to continue receiving sensor data as described above.

If the behavior is considered unacceptable, next, in a block 225, the computer 34 determines whether the occupant has previously been alerted, as described below with respect to a block 230. If the occupant has not been previously alerted, the process 200 proceeds to the block 230. If the occupant has been previously alerted, the process proceeds to a block 235. Thus, as shown in FIG. 2, the occupant is provided with one alert total before the process continues to the block 235. The computer 34 may alternatively be programmed to provide the occupant with no or multiple alerts.

If the occupant has not been previously alerted, next, in the block 230, the computer 34 alerts the occupant based on the selected category. For example, if the selected category is medical emergency, the computer 34 may instruct the user interface 48 to ask the condition of the occupant, e.g., "Are you all right?" If the selected category is behavior emergency, the computer 34 may instruct the user interface 48 to warn the occupant to cease the behavior, e.g., "Please put out your cigarette." The alert may be aural, visual, haptic, or any combination.

If, as determined in the decision block 225, the occupant has already been alerted, then in the block 235, the computer 34 selects a predetermined location. The predetermined locations may be stored in the memory of the computer 34 or may be looked up using, e.g., a map service and/or other data from a remote or "cloud" server, i.e., accessed via a wide area network such as cellular, the Internet, etc. The predetermined locations may include one or more emergency-response stations, such as an emergency room, hospital, and police station; and/or the present location of the vehicle 30. The predetermined location may be selected based on the selected category. For example, the predetermined location may be an emergency room for a medical emergency and a police station for a behavior emergency. For another example, the predetermined location may be a police station for a severe behavior emergency and the present location for a nonsevere behavior emergency.

Next, in a block 240, the computer 34 transmits a message to a remote server 52 based on the selected category. For example, in the event of a medical emergency, the computer 34 may instruct the transmitter 46 to transmit a message to the emergency-response station notifying the emergency-response station of the condition of the occupant and an estimated time of arrival.

Next, in a block 245, the computer 34 may navigate the vehicle 30 to the predetermined location. Navigation to the predetermined location may be based on the selected category, as described above with respect to the block 235. Furthermore, navigation to the predetermined location may be based on the category of a second behavior after alerting the occupant; that is, the process 200 may proceed to the block 215 once before the block 230 and to the block 215 once after the block 230, and the selection of the predetermined location in the block 235 may be based on the second selected category from the block 215. If the predetermined location is the present location of the vehicle 30, the computer 34 may take additional actions such as opening doors of the vehicle 30 and warning occupants to exit the vehicle 30 or remove cargo from the vehicle 30.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer programmed to:
   receive sensor data about a vehicle occupant inside a vehicle, wherein the sensor data comprises a combination of gestures by the vehicle occupant, facial expressions of the vehicle occupant, smoke production, and a voice level;
   select a category of behavior of the occupant of a plurality of categories of behavior based on the sensor data, wherein the selected category of behavior is one of a medical emergency, a severe behavior emergency, a non-severe behavior emergency, or a non-emergency;
   select a predetermined location associated with the category of behavior, wherein the predetermined location is an emergency room for the medical emergency, and wherein the predetermined location is a police station for the severe behavior emergency; and
   navigate the vehicle to the predetermined location based on the selected category and the sensor data.

2. The computer of claim 1, further programmed to transmit a message to a remote server based on the selected category.

3. The computer of claim 1, further programmed to alert the occupant based on the selected category, wherein alerting the occupant comprises communicating with the occupant through a user interface about the sensor data.

4. The computer of claim 3, further programmed to navigate to the predetermined location based on a category of a second behavior occurring after alerting the occupant, wherein the category of the second behavior is based on second sensor data about the vehicle occupant inside the vehicle received after alerting the occupant, and wherein the second sensor data comprises a combination of the gestures by the vehicle occupant, the facial expressions of the vehicle occupant, the smoke production, and the voice level.

5. The computer of claim 1, wherein the predetermined location is an emergency-response station.

6. The computer of claim 5, further programmed to transmit a message to the emergency-response station.

7. The computer of claim 1, wherein navigating to the predetermined location comprises remaining at a present location of the vehicle if the selected category of behavior is the non-severe behavior emergency.

8. A method comprising:
   receiving sensor data about a vehicle occupant inside a vehicle, wherein the sensor data comprises a combination of gestures by the vehicle occupant, facial expressions of the vehicle occupant, smoke production, and a voice level;
   selecting a category of behavior of the occupant of a plurality of categories of behavior based on the sensor data, wherein the selected category of behavior is one of a medical emergency, a severe behavior emergency, a non-severe behavior emergency, or a non-emergency;
   select a predetermined location associated with the category of behavior, wherein the predetermined location is an emergency room for the medical emergency, and wherein the predetermined location is a police station for the severe behavior emergency; and
   navigating the vehicle to the predetermined location based on the selected category and the sensor data.

9. The method of claim 8, further comprising transmitting a message to a remote server based on the selected category.

10. The method of claim 8, further comprising alerting the occupant based on the selected category, wherein alerting the occupant comprises communicating with the occupant through a user interface about the sensor data.

11. The method of claim 10, further comprising navigating to the predetermined location based on a category of a second behavior occurring after alerting the occupant, wherein the category of the second behavior is based on second sensor data about the vehicle occupant inside the vehicle received after alerting the occupant, and wherein the second sensor data comprises a combination of the gestures by the vehicle occupant, the facial expressions of the vehicle occupant, the smoke production, and the voice level.

12. The method of claim 8, wherein the predetermined location is an emergency-response station.

13. The method of claim 12, further comprising transmitting a message to the emergency-response station.

14. The method of claim 8, wherein navigating to the predetermined location comprises remaining at a present location of the vehicle if the selected category of behavior is the non-severe behavior emergency.

* * * * *